(12) United States Patent
Kodrin et al.

(10) Patent No.: US 8,289,154 B2
(45) Date of Patent: Oct. 16, 2012

(54) DEVICES, SYSTEMS AND METHOD OF DETERMINING THE LOCATION OF MOBILE PERSONNEL

(75) Inventors: David Kodrin, Trafford, PA (US); Lawrence Hutchings, Castro Valley, CA (US); Paul Kasameyer, Livermore, CA (US); Anthony Mathews, South Weber, UT (US); Stephen Jarpe, Prescott Valley, AZ (US)

(73) Assignee: Mine Safety Appliances Company, Cranberry Township, PA (US)

( * ) Notice: Subject to any disclaimer, the term of this patent is extended or adjusted under 35 U.S.C. 154(b) by 618 days.

(21) Appl. No.: 12/497,761

(22) Filed: Jul. 6, 2009

(65) Prior Publication Data

US 2010/0007485 A1    Jan. 14, 2010

Related U.S. Application Data

(60) Provisional application No. 61/080,675, filed on Jul. 14, 2008.

(51) Int. Cl.
*G08B 21/00* (2006.01)

(52) U.S. Cl. ............... 340/539.13; 340/573.1; 367/118; 702/150

(58) Field of Classification Search ............. 340/539.13, 340/573.1; 702/150, 155, 175; 367/117, 367/118
See application file for complete search history.

(56) References Cited

U.S. PATENT DOCUMENTS

| | | | |
|---|---|---|---|
| 5,724,265 A | 3/1998 | Hutchings | |
| 5,899,963 A | 5/1999 | Hutchings | |
| 6,122,960 A | 9/2000 | Hutchings et al. | |
| 6,305,221 B1 | 10/2001 | Hutchings | |
| 6,720,876 B1 | 4/2004 | Burgess | 340/568.1 |
| 2004/0143176 A1 | 7/2004 | Foxlin | 600/395 |
| 2005/0035857 A1 | 2/2005 | Zhang | 340/539.13 |
| 2007/0229356 A1 | 10/2007 | Kodrin | |

OTHER PUBLICATIONS

Cricket v2 User Manual; Cricket Project MIT Computer Science and Artificial Intelligence Lab, Cambridge MA 02139; http://cricket.csail.mit.edu/; Jan. 2005.

*Primary Examiner* — Jeffery Hofsass

(74) *Attorney, Agent, or Firm* — The Webb Law Firm

(57) ABSTRACT

A locator system for use in connection with at least one mobile person includes a mobile locator system adapted to be worn by the person, wherein the mobile locator system includes an inertial navigation system. The locator system further includes a reference locator system to provide information about a position of the mobile locator device relative to a coordinate system. In several embodiments, the reference locator system comprises an ultrasonic system. For example, the reference locator system can include at least one ultrasonic transmitter and at least one ultrasonic receiver. One of the at least one ultrasonic receiver and the at least one ultrasonic transmitter can be positioned at a known position on the coordinate system and the other of the at least one ultrasonic receiver and the at least one ultrasonic transmitter can be worn by the person. The reference locator system can also include a plurality of ultrasonic transmitters and a plurality of ultrasonic receivers. Each of the plurality of ultrasonic receivers or each of the plurality of ultrasonic transmitters can be positioned at known positions on the coordinate system. Each of the other of the plurality of ultrasonic receivers and the plurality of ultrasonic transmitters can be worn by one of a plurality of persons.

22 Claims, 6 Drawing Sheets

DEVICES, SYSTEMS AND METHOD OF DETERMINING THE LOCATION OF MOBILE PERSONNEL

RELATED APPLICATIONS

This application claims priority on U.S. Provisional Patent Application No. 61/080,675 filed Jul. 14, 2008, the entire disclosure of which is incorporated herein by reference.

BACKGROUND OF THE INVENTION

The present invention relates generally to devices, systems and methods of determining the location of mobile personnel and, particularly, to devices, systems and methods of determining the location of personnel working under hazardous conditions outdoors and/or within one or more structures.

Firefighters, first responders, and military personnel work in the world's most dangerous occupations in some of the world's most hazardous environments. Firefighters can easily become disoriented or separated since most firefighting is done in zero visibility as a result of smoke. First responders constantly place themselves in danger, which sometimes results in becoming trapped or disabled. Military personnel face dangerous conditions on a daily basis, and knowing where each soldier is located, whether performing routine tasks or under hostile fire, would be extremely valuable to the commanding officer. In all cases, there are examples where fatalities might have been prevented or injuries lessened in severity with a location system that provides location information about a person in need of assistance to other personnel to relatively quickly find that person.

In cases in which personnel are outdoors, global positioning system (GPS) devices and solutions can, for example, be used to roughly locate such personnel. However, multipath propagation problems lead to poor signals and inaccurate results with GPS devices when used within a structure. Moreover, without significant processing, GPS devices are typically accurate to approximately ±3 m. Although such inaccuracy can be acceptable for locating personnel and objects outdoors, an inaccuracy of 3 m within a structure can, for example, result in sending a rescue team to a wrong floor within the structure and thus squandering precious time in a rescue mission. Like GPS devices, other localization devices which use, for example, radio frequency energy, ultrasound energy and/or infrared energy can suffer from multipath propagation problems, leading to substantial inaccuracy when used within structures.

It thus remains desirable to develop improved devices, systems and methods of determining the location of mobile personnel that reduce the severity of or eliminate the above-described and other problems with current location devices, systems and methods.

SUMMARY OF THE INVENTION

In one aspect, the present invention provides a locator system for use in connection with at least one mobile person. The locator system includes a mobile locator system adapted to be worn by the person, wherein the mobile locator system includes an inertial navigation system. The locator system further includes a reference locator system to provide information about a position of the mobile locator device relative to a coordinate system. In several embodiments, the reference locator system comprises an ultrasonic system. For example, the reference locator system can include at least one ultrasonic transmitter and at least one ultrasonic receiver. One of the at least one ultrasonic receiver and the at least one ultrasonic transmitter can be positioned at a known position on the coordinate system and the other of the at least one ultrasonic receiver and the at least one ultrasonic transmitter can be worn by the person. The reference locator system can also include a plurality of ultrasonic transmitters and a plurality of ultrasonic receivers. Each of the plurality of ultrasonic receivers or each of the plurality of ultrasonic transmitters can be positioned at known positions on the coordinate system. Each of the other of the plurality of ultrasonic receivers and the plurality of ultrasonic transmitters can be worn by one of a plurality of persons.

In several embodiments, the reference locator system includes at least one beacon device including an ultrasonic transmitter positioned at a known position on the coordinate system and at least one listener device worn by the person. The listener device can include an ultrasonic receiver. The reference locator system can include a plurality of beacon devices, wherein each beacon device includes an ultrasonic transmitter and is positioned at a known position on the coordinate system. The reference locator system can also include at least one listener device, which includes an ultrasonic receiver, and is worn by the person.

The reference locator system can, for example, be adapted to provide information of position on the coordinate system of the mobile locator system and an initial orientation of movement relative to the coordinate system of the person. The reference locator system can, for example, be adapted to calibrate the mobile locator system.

In several embodiments, the reference locator system include a timing system to broadcast a timing signal. The timing signal can, for example, be an RF signal.

In addition to or in the alternative to an ultrasonic system, the reference locator system can, for example, include a global positioning system, an enhanced 911 system or an ultra-wide bandwidth system.

In several embodiments, the reference locator system has an accuracy of ±1 foot. The reference locator system can also have an accuracy of ±1 inch.

In another aspect, the present invention provides a method of locating at least one mobile person, including: attaching a mobile locator system to the person, wherein the mobile locator system includes an inertial navigation system, and providing a reference locator system to provide information about a position of the mobile locator device relative to a coordinate system.

The reference locator system can, for example, be adapted to provide information of position on the coordinate system of the mobile locator system and an initial orientation of movement of the person relative to the coordinate system.

The method can further include calibrating the mobile locator system using data from the reference locator system.

As described above, the reference locator system can, for example, have an accuracy of ±1 foot or even an accuracy of ±1 inch.

In several embodiments, the reference locator system includes an ultrasonic system. The reference locator system can, for example, include at least one ultrasonic transmitter and at least one ultrasonic receiver. One of the at least one ultrasonic receiver and the at least one ultrasonic transmitter can be positioned at a known position on the coordinate system, and the other of the at least one ultrasonic receiver and the at least one ultrasonic transmitter can be worn by the person. The reference locator system can also include a plurality of ultrasonic transmitters and a plurality of ultrasonic receivers. Each of the plurality of ultrasonic receivers or each of the plurality of ultrasonic transmitters can be positioned at known positions on the coordinate system, and each of the other of the plurality of ultrasonic receivers and the plurality of ultrasonic transmitters can be worn by one of a plurality of persons.

In several embodiments, the reference locator system includes at least one beacon device including an ultrasonic transmitter positioned at a known position on the coordinate system and at least one listener device worn by the person. The listener device includes an ultrasonic receiver. The reference locator system can also include a plurality of beacon devices, wherein each beacon device includes an ultrasonic transmitter and is positioned at a known position on the coordinate system. The reference system can further include at least one listener device, which includes an ultrasonic receiver, worn by the person.

The present invention, along with the attributes and attendant advantages thereof, will best be appreciated and understood in view of the following detailed description taken in conjunction with the accompanying drawings.

DETAILED DESCRIPTION OF THE INVENTION

In several embodiments, the present invention provides systems for use in determining the position or location of one or more mobile persons (for example, persons working in a dangerous or hazardous environment). Such a system can, for example, include a mobile locator system that is operable to provide data on the location or position of a mobile person. Each of the mobile locator systems is operable or adapted to be associated with (for example, worn by, carried by etc.) one mobile person. Each of the mobile locator systems also can include a communication devices such as a transmitter that is operable to transmit data signals to determine the location of one or more mobile persons equipped with the mobile locator systems.

In several representative embodiments of the present invention, the mobile locator systems of the present invention are operable to measure or track the movement of the mobile person. For example, mobile locator systems, including an inertial navigation system, can be worn by firefighters inside buildings during an incident. In general, such tracking systems do not require an external reference signal (for example, requiring the transmission and/or reception of an energy signal) in the measurement/tracking process. Thus, such tracking systems do not suffer from multipath propagation and other problems associated with many systems which use, for example, radio frequency energy, ultrasound energy and/or infrared energy in determining position.

Figure 1:
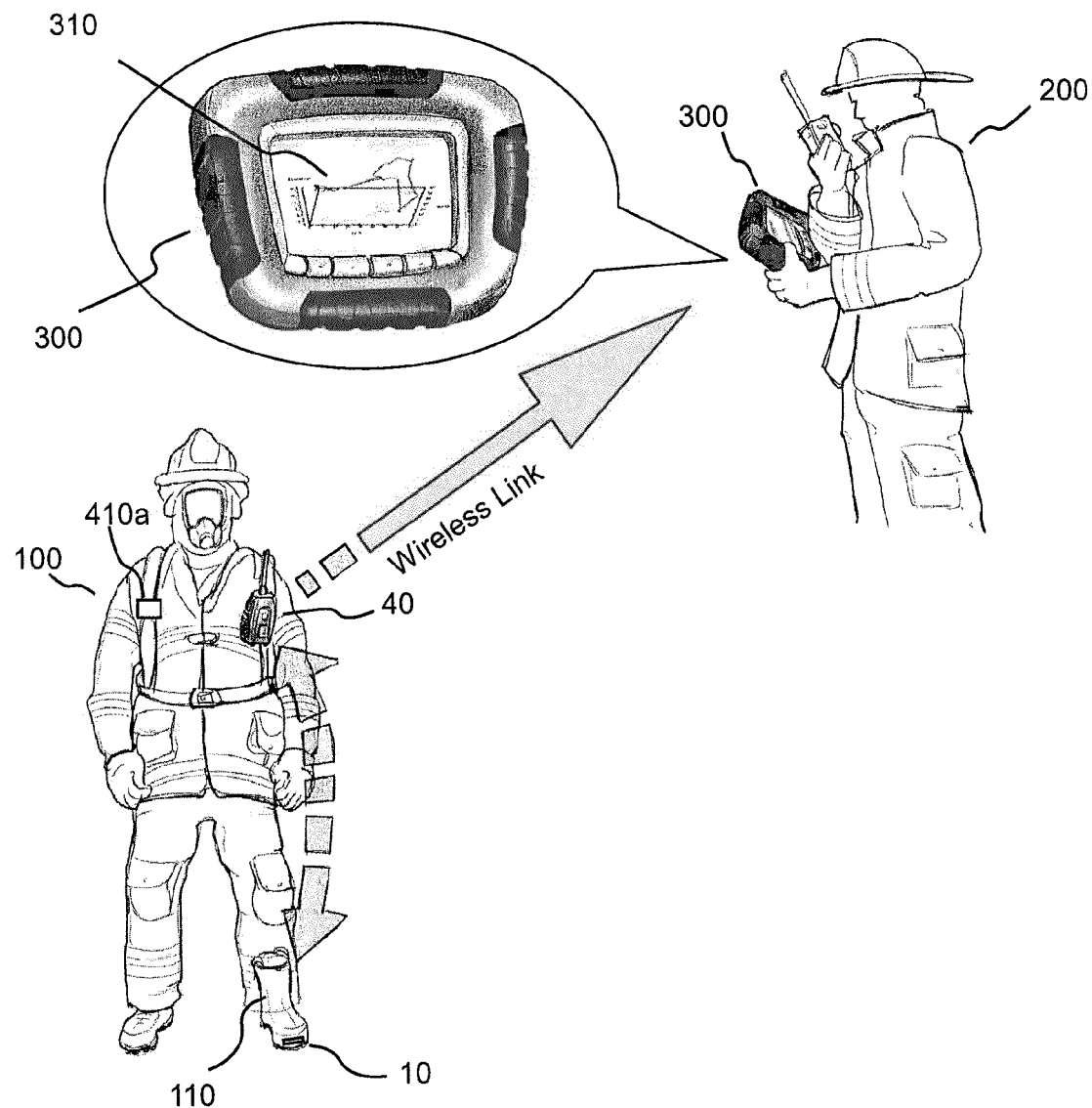
FIG. 1 illustrates a firefighter equipped with a mobile locator system of the present invention and communication of position information therefrom to a remote device/user.

As illustrated in FIG. 1, a mobile locator system 10 including an inertial navigation system can, for example, be positioned near or at the toe portion of a boot 110 of a firefighter 100. Mobile locator systems 10 determine the location of and track each firefighter, and communicate (for example, via a communication device 40 worn by each firefighter 100) that information to, for example, the incident commander 200 and/or other remote personnel. In several embodiments, communication device 40 is a transceiver of a Personal Alert Safety System or PASS device worn by firefighter 100. Mobile locator system 10 can, for example, have a wired or wireless connection with communication device 40. Mobile locator system 10 can alternatively include a dedicated communication system including a transmitter or transceiver. Incident commander 200 and/or other personnel can, for example, be equipped with a base unit 300 that, for example, includes a display 310 to provide information of the location of one or more firefighters 100.

Inertial navigation systems can, for example, include acceleration sensors and angle rate sensors to measure the motion of one or more firefighters 100. Inertial navigation systems can further include software to infer the location of and track the movements of firefighters 100 from that information. Inertial navigation systems suitable for use in the present invention are, for example, described in U.S. Pat. Nos. 6,305,221, 6,122,960, 5,998,963 and 5,724,265, the disclosures of which are incorporated herein by reference.

Figure 2A:
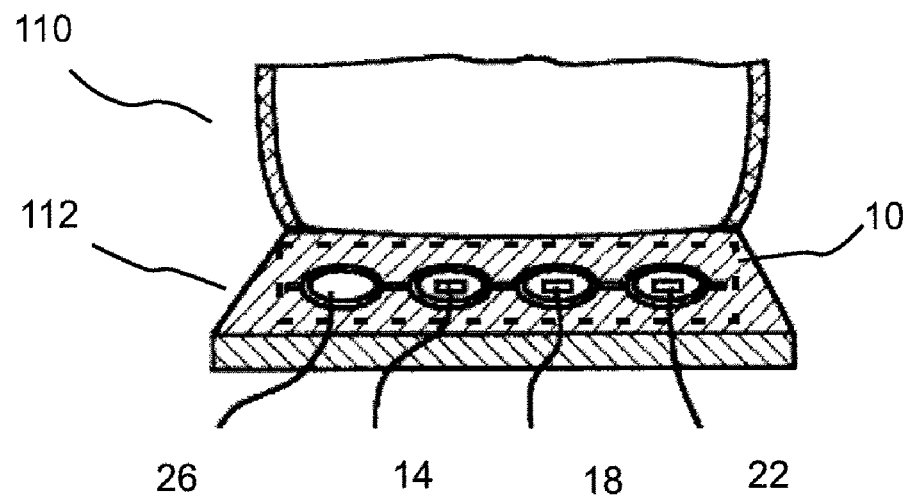
FIG. 2A illustrates a mobile locator system of the present invention (including an inertial navigation system) incorporated within the sole of footwear such as a boot.

FIG. 2 illustrates one embodiment of a mobile locator system 10 for positioning in a sole 112 of boot 110 as described in U.S. Pat. No. 6,305,221. However, as is clear to one skilled in the art, various components of the system may be implemented in a variety of arrangements and on a variety of positions on a firefighter's body. In the case that inertial navigation systems and/or methodologies as disclosed in U.S. Pat. Nos. 6,305,221, 6,122,960, 5,998,963 and 5,724,265 are used in connection with mobile locator systems 10 of the present invention, the sensor of the mobile locator systems 10 are preferably placed on or near the foot. One skilled in the art appreciates that use of other tracking and/or inertial navigation system algorithms or methodologies can enable positioning of the systems at other positions on the body.

In one embodiment, accelerometers 14, rotational sensors 18 and a contact switch 22 are placed, for example, in sole 112 of boot 110 (see FIG. 2A) so that they may come in contact with the ground for each step during walking, running etc. In another embodiment, accelerometers 14, rotational sensors 18 and switch 22 are contained within a housing 530 (see, for example, FIG. 2B) of a user-worn system 500 that is attached to an exterior portion of boot 110.

Mobile locator system 10 can operate with or without contact switch 22. For example, another mechanism can be used to generate a signal to indicate the beginning of each step. Locator system 10 can, for example, include three rotational sensors 18, each configured to measure the angle of the user's foot with respect to a reference frame. Each rotational sensor 18 converts the measured angle into a corresponding signal, which is employed by a processor 26 (for example, a microprocessor) to calculate information related to the user's movements, such as the user's speed, distance traveled and the height climbed or jumped.

Mobile locator system 10 can also include, for example, three accelerometers 14, each configured to measure the acceleration of the user's foot with respect to a reference frame. Each accelerometer can, for example, convert a measured acceleration into a corresponding signal, which can be processed by processor 26 to accomplish movement measurements.

Three linear accelerometers 14 can, for example, be provided with one in each of the X, Y and Z direction. Likewise, three rotational sensors 18 can, for example, be provided with one on each of the X, Y and Z axes. When mobile locator system 10 is initially at rest, these directions define a reference coordinate system. Rotational sensors 18 can, for example, be velocity rotation devices, such as a gyroscope, which measure rotational velocity. Rotational sensors 18 are not accelerometers and, therefore, do not measure acceleration or angular acceleration. The output of each rotational sensor 18 can, for example, be integrated once to determine the angles defining the orientation of sensors 18 as a function of time. Thus, these angles define a translational coordinate system that varies in three dimensions throughout a stride. The output of each linear accelerometer 14 is integrated twice in the reference coordinate system to determine a distance in each of the X, Y, and Z directions. These values are then used to calculate a new location point relative to a previous point.

Preferably, rotational sensors 18 and the linear accelerometers 14 are located on the foot of firefighter 100 as described above. In one embodiment, when the foot stops, the outputs of linear accelerometers 14 and rotational sensors 18 are observed. Since there should be no signals when the foot is stopped, any outputs are known to be error signals and are then subtracted from the last calculated value to establish a new reference point for the next calculation cycle, (that is, until the foot comes to rest again). Linear accelerometers 14 are, for example, orthogonal to each other and placed as close together as possible.

Accelerometers 14 are located at the origin of the axes which define the reference coordinate system when the foot is at rest. This reference system remains stationary throughout a step. The translational coordinate system, which is formed of the three axes aligned with rotational sensors 18, moves with the foot. The readings in the translational coordinate system are calculated to determine the actual motion within the reference coordinate system. At the end of a step, the beginning and ending points are used to determine the distance traveled in three dimensions. Since the coordinate systems are three dimensional, any two axes will define a plane. However, the planes are not defined with respect to the foot or to the ground. They may be in any orientation as defined by the orientation of the sensors on the foot and by the orientation of the foot on the ground. However, these planes are not used as part of any calculations by locator system 10. In this way, system 10 does not use a datum plane, let alone one defined by sole 112 of boot 110 or with reference to the ground when the foot is at rest on the ground.

As described above, tracking systems such as inertial navigation systems of the present invention do not suffer from multipath propagation and other problems associated with systems in which energy is transmitted between one or more references and a mobile device to determine the positions of the mobile device. In several embodiments, however, mobile locator systems 10 are initialized and/or calibrated via the use of external energy/information to provide a starting (and/or subsequent) location and/or orientation provided by a second, reference localization or locator system or grid 400 (see FIGS. 3A and 3B). Initialization as used herein refers to determination of an initial position and/or orientation. Initialization enables overlay of the location of multiple firefighters upon a reference grid or coordinate system. Information from one or more points from reference locator system can also be used to calibrate and improve the operational accuracy of mobile locator systems 10.

In general, reference locator system 400 preferably has an accuracy of ±1 foot, ±2 inches or even ±1 inch. A number of reference locator systems in which energy is transmitted to (and/or received from) mobile devices can be used in connection with the present invention. For example, use of GPS or E911 systems (a feature of the 911 emergency-calling system that automatically associates a physical address with the calling party's telephone number) can be used. However, such systems have inherent inaccuracy problems. Various algorithms can be used to increase the accuracy of such systems as known in the art, but such algorithms can be difficult to effect and may require substantial processing, which can make real time determinations difficult. Moreover, such systems are "provided" by governments or third parties and control of aspects thereof are not available to the users of the systems of the present invention.

Another type of reference locator system that can be used is an ultra-wide bandwidth or UWB locator system as, for example, disclosed in U.S. Patent Application Publication No. 2007/0229356 (U.S. patent application Ser. No. 11/705, 891, filed Feb. 13, 2007), the disclosure of which is incorporated herein by reference. Use of such an ultra-wide bandwidth system provides inherent accuracy suitable for use in the present invention and enables full control over the reference locator system. Furthermore, use of electromagnetic energy having a frequency suitable to facilitate transmission through structures without substantial multipath propagation problems can be used in connection with UWB systems. For example, electromagnetic energy in the frequency range of 100 MHz to 1 GHz can be used. Use of UWB-based reference locator systems might thus enable initialization and/or calibration at an open staging area and subsequent re-initialization and/or recalibration after a firefighter or other mobile person has entered a structure.

In another embodiment, reference locator system 400 includes locator devices 410 including, for example, ultrasonic systems or devices including ultrasonic transmitters, which are deployed, for example, on or by each fire engine or fire truck at an incident. Ultrasonic receivers can also, for example, be mounted on each firefighter to provide information about starting location and orientation. Alternatively or additionally, ultrasonic transmitters can be worn by each firefighter, and ultrasonic receivers can be deployed, for example, on or by each fire engine. An example of a system including suitable ultrasonic locator devices or nodes for use in the present invention is the CRICKET system available from Crossbow Technologies, Inc. of San Jose, Calif. Such transmission nodes can, for example, define an area within about 10 m of the fire truck where the distances from each firefighter to each transmission node can be measured. Thus, as the firefighters exit the fire truck and prepare to enter the building, information about their position relative to the coordinate system defined by the transmission nodes is made available to the inertial navigation system of mobile locator systems 10.

In the CRICKET devices, a small printed circuit board that contains a processor and an RF device interfaces with an ultrasonic piezoelectric oscillator as set forth in the Cricket v2 User Manual, Cricket Project, MIT Computer Science and Artificial Intelligence Lab (January 2005), a copy of which is attached hereto as an Appendix, and the disclosure of which is incorporated herein by reference and made a part hereof. The small board, or mote, can be configured as a beacon or as a listener. If set up as a beacon, the processor can concurrently send a signal to the its RF transmitter and its ultrasonic oscillator. The RF signal operates as a timing signal. The listener device can determine the time difference between the RF signal (which travels at the speed of light) and the ultrasonic signal (which travels at the speed of sound) to determine the time of travel for the sonic signal. Knowing the speed of sound in air, the distance between the beacon and the listener can be determined. The ultrasonic transmitter range in meters and accuracy in centimeters is shown in Table 1 below for such a system.

TABLE 1

| Accuracy | Range |
| --- | --- |
| 1 cm | 3.5 meters |
| 2 cm | 10.5 |
| Maximum range | 10.5 meters |

As described above, locator devices 410 use a combination of RF and ultrasound technologies to provide location information to attached host devices. Devices 410 in beacon mode can be placed at various positions (for example, on each fire engine and on one or more position cones) and broadcast information on an RF channel. With each RF broadcast, beacon locator devices 410 transmit a concurrent ultrasonic pulse. Locator devices 410a (see FIGS. 1, 3A and 3B), operating in a listener mode, can, for example, be attached to mobile firefighters 100 and listen for RF signals. Upon receipt of the first few bits of the RF signal, locator devices 410a listen for the corresponding ultrasonic pulse. When the ultrasonic pulse arrives, locator device 410a (listener) obtains a distance estimate for the corresponding locator device 410 (beacon) on the basis of the difference in propagation speeds between RF signals (traveling at the speed of light) and ultrasound signals (traveling at the speed of sound). Locator device 410a (listener) executes algorithms that correlate RF and ultrasound samples and pick the best correlation. The ultrasound samples are simple pulses with no data encoded on them. Even in the presence of several competing beacon transmissions, locator devices 410a can achieve good precision and accuracy relatively quickly.

Locator device 410a (operating as a listener) can, for example, attach to a host device using an RS232 serial connection. As described above, in the case of the CRICKET system, the beacon and listener devices are identical hardware devices. The devices can function as either a beacon or a listener, all under software control.

Figure 2B:
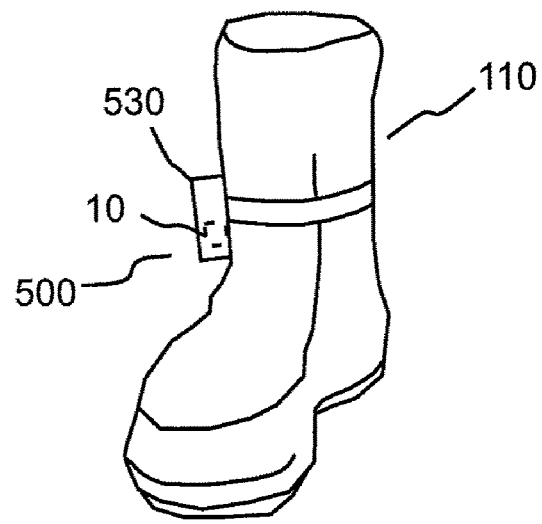
FIG. 2B illustrates a mobile locator system of the present invention (including an inertial navigation system) attached to the side of footwear such as a boot.
Figure 4:
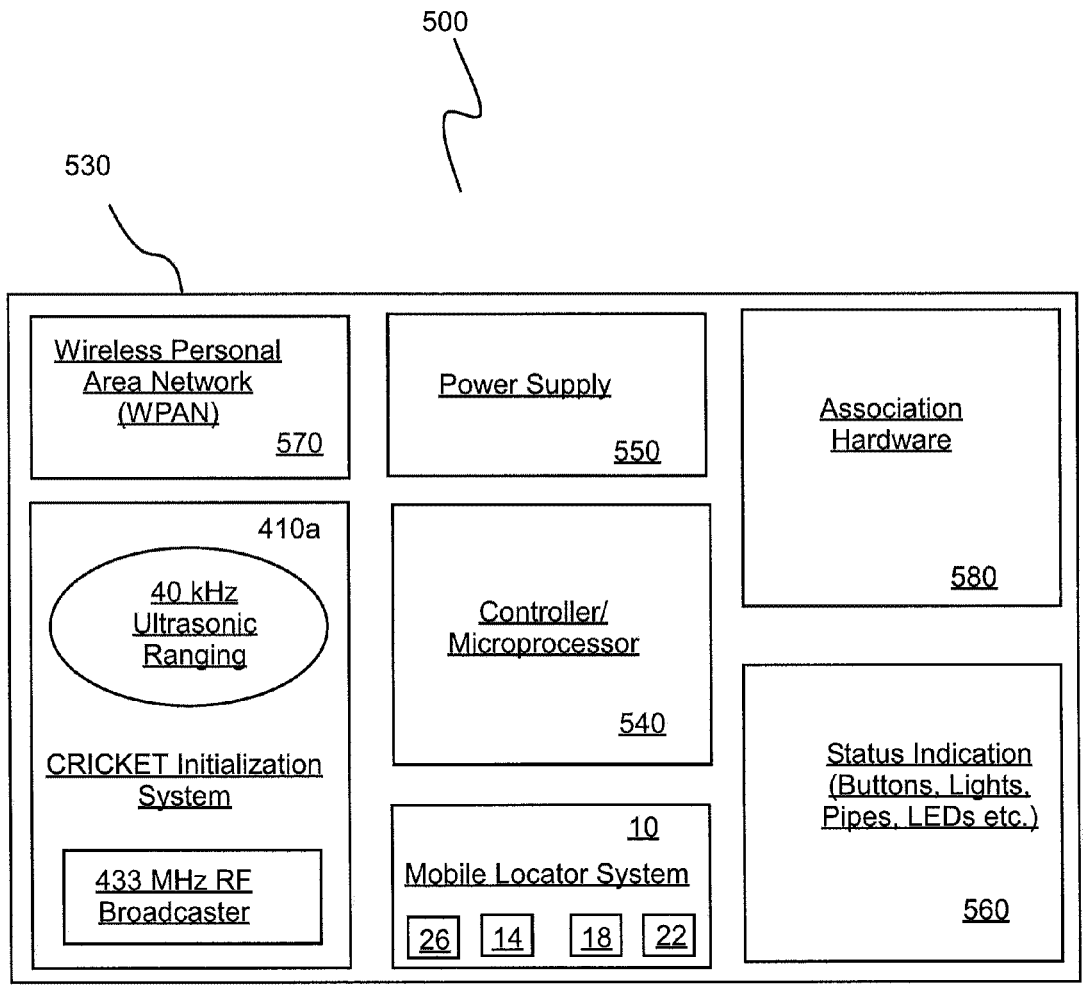
FIG. 4 illustrates a block diagram of one embodiment of a mobile locator system of the present invention.

FIG. 4 illustrates a block diagram of one embodiment of user-worn system 500 as, for example, worn on the side of a firefighter's boot 110 (see, for example, FIG. 2B). In the illustrated embodiment, mobile locator system 10 and locator device or system 410a are incorporated within common housing 530 of user-worn system 500. In that regard, the reference/calibration locator system component represented by locator device 410a is preferably placed in close proximity to mobile locator system 10 to, for example, improve accuracy. In the illustrated embodiment, mobile locator system 10 and locator device 410a are in communication with a common control system or controller 540 (for example, a microprocessor) and a common power supply 550 (for example, including one or more batteries, which can be rechargeable and/or replaceable batteries). Status indicator 560 (for example, buttons, lights etc.) can be used to provide information of the status of system 500 to a user.

In the illustrated embodiment, a wireless personal area network or WPAN system 570 is used to communicate data from system 500 (for example, position data) to, for example, communication device/system 40. Associated hardware/software 580 as known in the art can be included with or integrated with WPAN system 570 to associate data communicated from WPAN system 570 with communication device 40 of firefighter 100 wearing system 500 (thereby, assisting to ensure that data from one firefighter is not communicated to and associated with a communication device of another firefighter).

Once a firefighter 100 is inside a building, the data from ultrasonic reference locator system 400 will likely be erroneous and of very limited use in position location. However, the initialization and/or calibration of mobile locator systems 10 provided by reference locator system 400 provides substantial benefits referencing the mobile locator systems 10 to a coordinate system and in improving the accuracy of mobile locator systems 10 in tracking of firefighter position. In the calibration process, reference locator system 400 provides redundant data for comparison of data provided by mobile locator systems 10 so that mobile locator systems 10 (or the data therefrom) can be adjusted to improve/reduce any errors associated therewith.

Figure 3A:
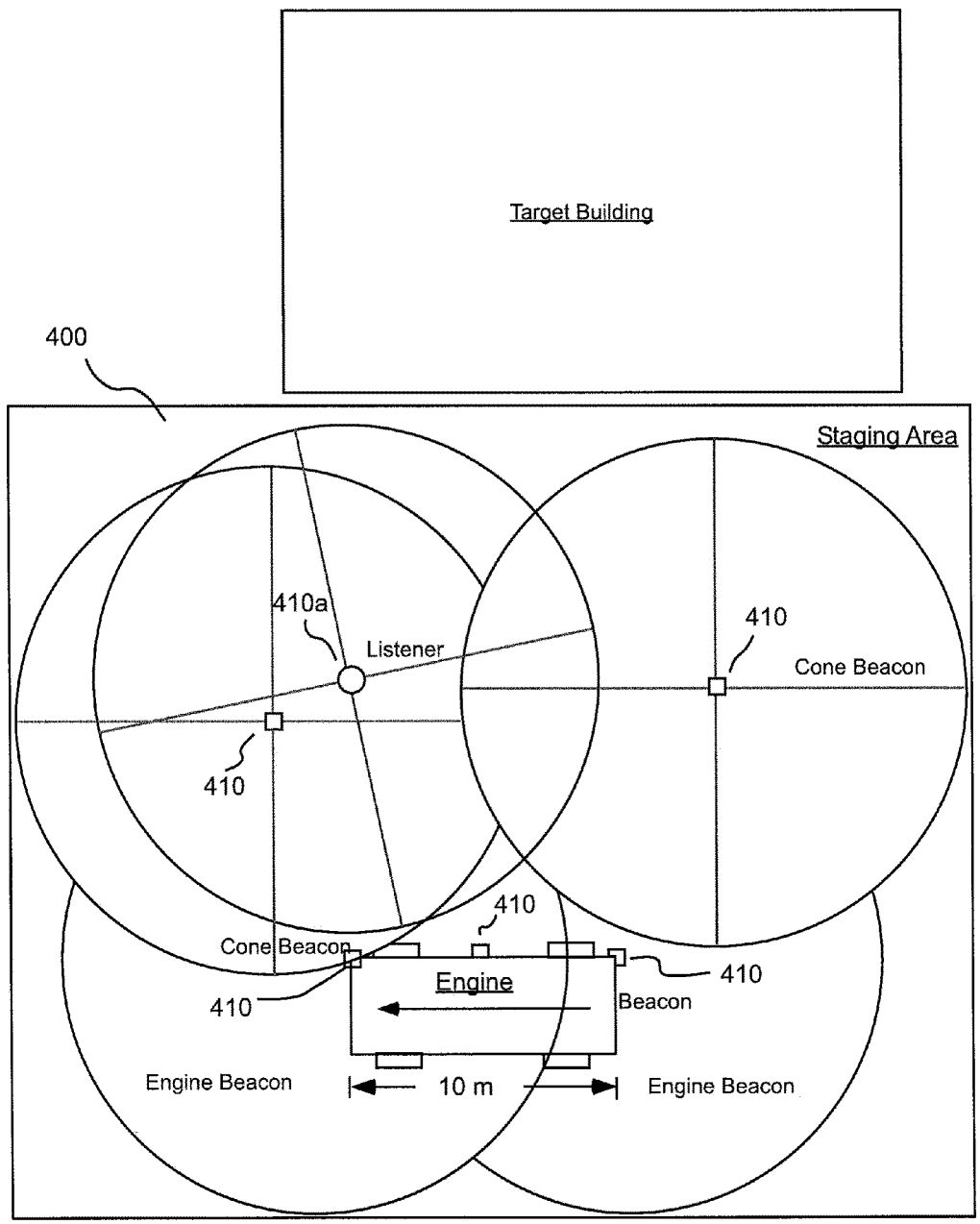
FIG. 3A illustrates deployment of a reference locator system in the staging area of an incident scene for initialization and/or calibration of the mobile locator devices of FIG. 1.
Figure 3B:
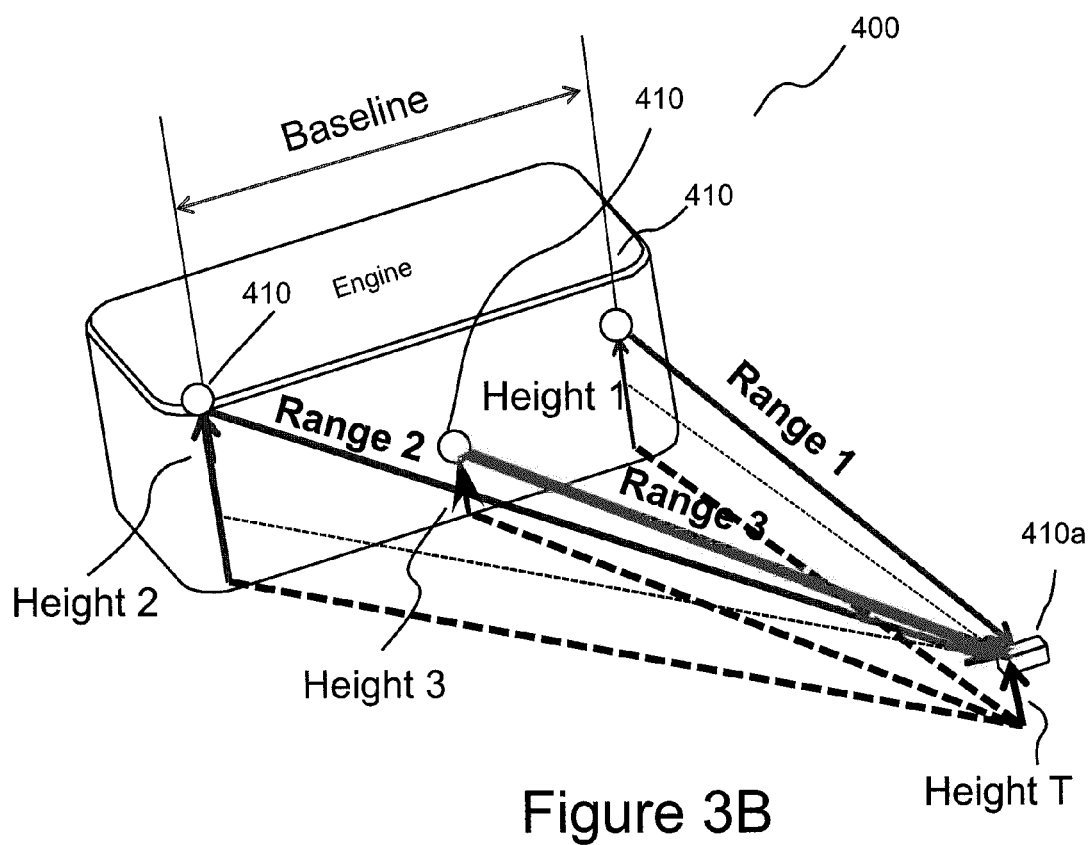
FIG. 3B illustrates the relationship of three locator devices of the reference locator system positioned on a fire engine with another locator device of the reference locator system worn by a firefighter (who is also equipped with the mobile locator system of FIG. 1).

With reference, for example, to FIGS. 3A and 3B, an example of an operational scenario follows. Initially, one or more fire engines arrive at the scene. Beacon locator devices 410 can be placed on one or more of the fire engines and/or set out at in a staging area using, for example, positioning cones. When a firefighter 100 traverses the staging area, locator device 410a, which is worn by firefighter 100 and acts as a listener, tracks the ranges from the beacons and computes the range to each locator device/beacon 410. A Kalman filter can, for example, be used during calibration and alignment/initialization of the inertial system of mobile locator systems 10 as firefighter 100 works in the staging area. As known in the art, Kalman filters are efficient recursive filters that can estimate the state of a dynamic system from a series of incomplete and/or noisy measurements. No special movement or procedure need be demanded of any firefighter 100 in the staging area. FIGS. 3A and 3B illustrate possible geometries of the staging area. Because coordinates in the local plane are required, the heights above the mean plane of the beacons and the listeners are included in position computations.

Figure 5A:
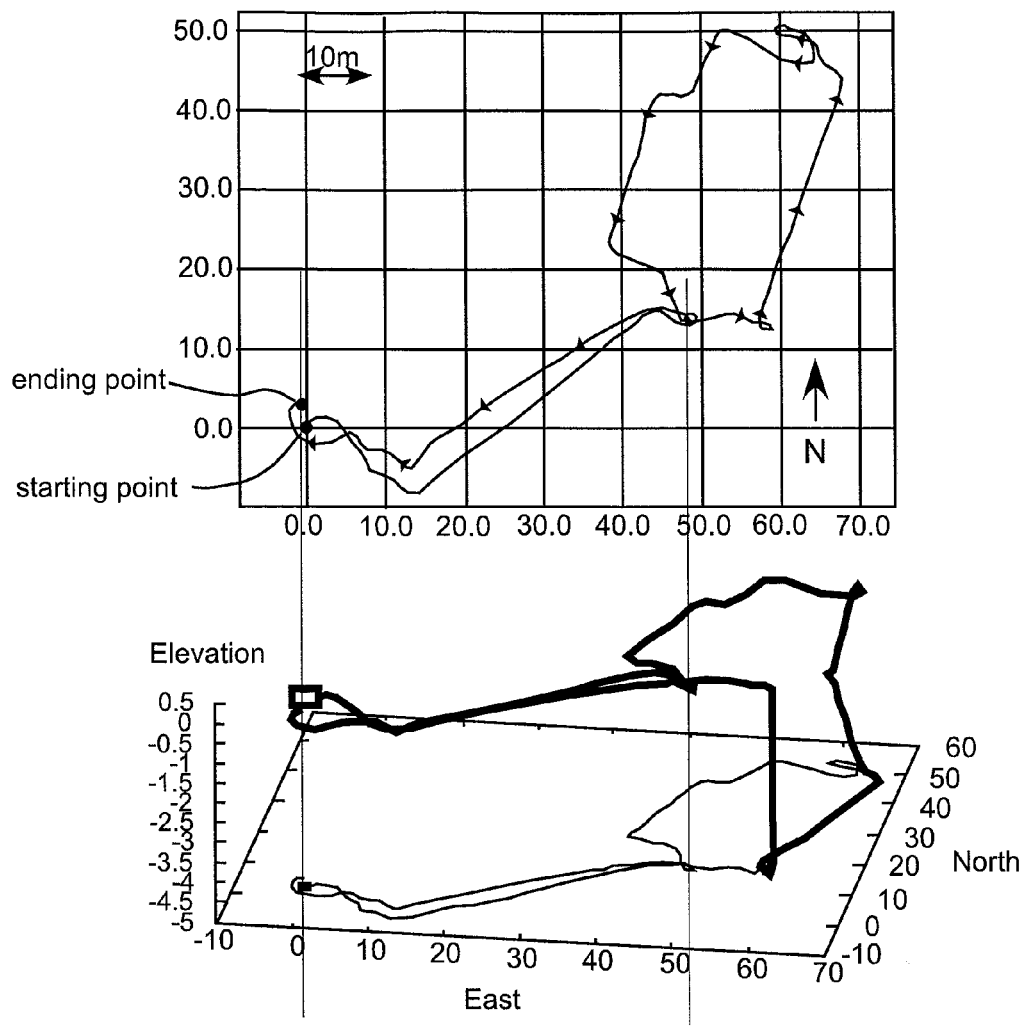
FIG. 5A illustrates an example of a two-dimensional (upper) and a three-dimensional (lower) tracking display generated by a system of the present invention.
Figure 5B:
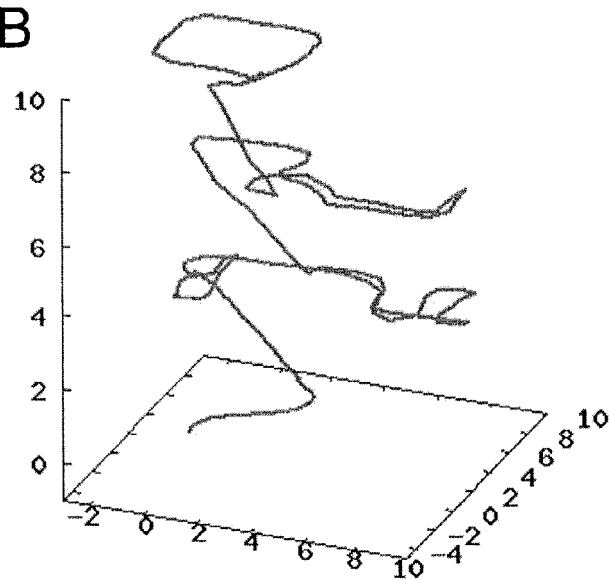
FIG. 5B illustrates another example of a three-dimensional tracking display generated by a system of the present invention.

FIGS. 5A and 5B illustrate two examples of resulting, three dimensional locator tracks using mobile locator devices 10 as initialized and/or calibrated using reference locator system 400. The graphs of FIGS. 5A and 5B can, for example, be provided on display 310 of device 300 and/or the information can be provided in one or more other formats. For example, the relative position of several firefighter can be provided. A rapid intervention or rescue team can, for example, use such data to be guided to the position of a downed firefighter. The status of a firefighter as "downed" or injured can, for example, be determined using one or more sensors of a PASS (personal alert safety system) alarm worn by the firefighter as known in the art.

As clear to one skilled in the art, listener devices can be positioned at various known positions (for example, on one or more fire engines) and beacon devices can be worn by the mobile persons or firefighters.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A locator system for use in connection with at least one mobile person, comprising:
   a mobile locator system adapted to be worn by the person, the mobile locator system comprising an inertial navigation system, which comprises a plurality of accelerometers and/or rotational sensors, wherein the mobile locator system of the person is located at or near the person's foot; and
   a reference locator system to provide information about a position of the mobile locator system relative to a coordinate system, wherein the reference locator system comprises a plurality of devices configured to be deployed in an area at least partially defined by the coordiate system.

2. The locator system of claim 1 wherein the reference locator system comprises an ultrasonic system.

3. The locator system of claim 2 wherein the reference locator system comprises at least one ultrasonic transmitter and at least one ultrasonic receiver, one of the at least one ultrasonic receiver and the at least one ultrasonic transmitter being positioned at a known position on the coordinate system and the other of the at least one ultrasonic receiver and the at least one ultrasonic transmitter being worn by the person.

4. The locator system of claim 2 wherein the reference locator system comprises a plurality of ultrasonic transmitters and a plurality of ultrasonic receivers, each of the plurality of ultrasonic receivers or each of the plurality of ultrasonic transmitters being positioned at known positions on the coordinate system and each of the other of the plurality of ultrasonic receivers and the plurality of ultrasonic transmitters being worn by one of a plurality of persons.

5. The locator system of claim 2 wherein the reference locator system comprises at least one beacon device comprising an ultrasonic transmitter positioned at a known position on the coordinate system and at least one listener device worn by the person and comprising an ultrasonic receiver.

6. The locator system of claim 2 wherein the reference locator system comprises a plurality of beacon devices, wherein each beacon device comprises an ultrasonic transmitter and is positioned at a known position on the coordinate system, and at least one listener device worn by the person and comprising an ultrasonic receiver.

7. The locator system of claim 6 wherein the reference locator system is adapted to provide information of position on the coordinate system of the mobile locator system and an initial orientation of movement relative to the coordinate system of the person.

8. The locator system or claim 6 wherein the reference locator system further comprises a timing system to broadcast a timing signal.

9. The locator system of claim 8 wherein the timing signal is an RF signal.

10. The locator system of claim 1 wherein the reference locator system is adapted to provide information of position on the coordinate system of the mobile locator system and an initial orientation of movement of the person relative to the coordinate system.

11. The locator system of claim 10 wherein the reference locator system is adapted to calibrate the mobile locator system.

12. The locator system of claim 1 wherein the reference locator system comprises a global positioning system, an enhanced 911 system or an ultra-wide bandwidth system.

13. The locator system of claim 1 wherein the reference locator system has an accuracy of ±1 foot.

14. The locator system of claim 1 wherein the reference locator system has an accuracy of ±1 inch.

15. A method of locating at least one mobile person, comprising:
   attaching a mobile locator system to the person, the mobile locator system comprising an inertial navigation system, which comprises a plurality of accelerometers and/or rotational sensors, wherein the mobile locator system of the person is located at or near the person's foot; and
   providing a reference locator system to provide information about a position of the mobile locator system relative to a coordinate system by deploying a plurality of devices in an area at least partially defined by the coordinate system.

16. The method of claim 15 wherein the reference locator system comprises an ultrasonic system.

17. The method of claim 16 wherein the reference locator system comprises at least one ultrasonic transmitter and at least one ultrasonic receiver, one of the at least one ultrasonic receiver and the at least one ultrasonic transmitter being positioned at a known position on the coordinate system and the other of the at least one ultrasonic receiver and the at least one ultrasonic transmitter being worn by the person.

18. The method of claim 16 wherein the reference locator system comprises a plurality of ultrasonic transmitters and a plurality of ultrasonic receivers, each of the plurality of ultrasonic receivers or each the plurality of ultrasonic transmitters being positioned at known positions on the coordinate system and each of the other of the plurality of ultrasonic receivers and the plurality of ultrasonic transmitters being worn by one of a plurality of persons.

19. The method of claim 16 wherein the reference locator system comprises at least one beacon device comprising an ultrasonic transmitter positioned at a known position on the coordinate system and at least one listener device worn by the person and comprising an ultrasonic receiver.

20. The method of claim 16 wherein the reference locator system comprises a plurality of beacon devices, wherein each beacon device comprises an ultrasonic transmitter and is positioned at a known position on the coordinate system, and at least one listener device worn by the person and comprising an ultrasonic receiver.

21. The method of claim 20, wherein at least one of the beacon devices is configured to broadcast a timing signal.

22. The method of claim 21, wherein the timing signal comprises an RF signal, the method further comprising:
   receiving the RF signal;
   listening for a corresponding ultrasonic pulse; and
   obtaining a distance estimate based at least partially on the difference in propagation speeds of the RF signal and the ultrasonic pulse.

* * * * *